United States Patent
Khan et al.

(10) Patent No.: US 8,762,589 B2
(45) Date of Patent: Jun. 24, 2014

(54) DATA TRANSFER BETWEEN DEVICES MAINTAINING STATE DATA

(75) Inventors: Haider Ali Khan, Austin, TX (US); Matthew John Koenn, Austin, TX (US); John Robert Breyer, Austin, TX (US); Christopher Frederick Graf, Liberty Hill, TX (US); Siddharth Sethi, Austin, TX (US); Christopher Scott Green, Austin, TX (US)

(73) Assignee: National Instruments Corporation, Austin, TX (US)

( * ) Notice: Subject to any disclaimer, the term of this patent is extended or adjusted under 35 U.S.C. 154(b) by 187 days.

(21) Appl. No.: 12/691,815

(22) Filed: Jan. 22, 2010

(65) Prior Publication Data

US 2011/0185087 A1   Jul. 28, 2011

(51) Int. Cl.
*G06F 3/00* (2006.01)

(52) U.S. Cl.
USPC .................................. 710/14; 710/32; 710/33

(58) Field of Classification Search
USPC ........................................................... 710/14
See application file for complete search history.

(56) References Cited

U.S. PATENT DOCUMENTS

| 4,750,171 | A | * | 6/1988 | Kedar et al. ................... 370/445 |
| 5,307,472 | A |   | 4/1994 | Chateau et al. |
| 5,594,702 | A |   | 1/1997 | Wakeman et al. |
| 5,603,011 | A | * | 2/1997 | Piazza .......................... 711/170 |
| 5,659,749 | A |   | 8/1997 | Mitchell et al. |
| 5,694,333 | A |   | 12/1997 | Andrade et al. |
| 5,913,028 | A |   | 6/1999 | Wang et al. |
| 6,181,686 | B1 |   | 1/2001 | Hamalainen et al. |
| 6,380,935 | B1 |   | 4/2002 | Heeschen et al. |
| 6,393,493 | B1 |   | 5/2002 | Madden et al. |
| 6,412,028 | B1 |   | 6/2002 | Steed et al. |
| 6,418,488 | B1 |   | 7/2002 | Chilton et al. |
| 6,601,139 | B1 |   | 7/2003 | Suzuki |
| 6,720,968 | B1 |   | 4/2004 | Butler et al. |
| 6,839,777 | B1 |   | 1/2005 | Vrancic et al. |
| 6,941,390 | B2 |   | 9/2005 | Odom |
| 6,963,933 | B2 | * | 11/2005 | Saito et al. ..................... 710/1 |
| 7,191,257 | B2 |   | 3/2007 | Ali Khan et al. |

(Continued)

OTHER PUBLICATIONS

Genesys Logic, Ic., "GL824: USB 2.0 On-The-Go Controller", Datasheet, Preliminary Revision 0.62, Apr. 19, 2005, pp. 1-43.

*Primary Examiner* — Henry Tsai
*Assistant Examiner* — John Roche
(74) *Attorney, Agent, or Firm* — Meyertons Hood Kivlin Kowert & Goetzel, P.C.; Jeffrey C. Hood; Joel L. Stevens

(57) ABSTRACT

Transferring data between devices utilizing state data. The devices may include a writer device and a reader device, each coupled to a common bus. A host device may create a transfer session between the devices. Each of the host device, the writer device, and the reader device may maintain state data of the transfer session. The host device may notify at least one of the reader device or the writer device of a state change from a disabled state to an enabled state. After enabling, data may be transferred directly between the writer device and the reader device without involving the host device. Finally, the host device may notify at least one of the reader device or the writer device of a state change from the enabled state to the disabled state. After disabling, the direct transfer of data between the writer device and the reader device may be stopped.

20 Claims, 8 Drawing Sheets

(56) References Cited

U.S. PATENT DOCUMENTS

| | | |
|---|---|---|
| 7,228,189 B1 | 6/2007 | Gaddy et al. |
| 7,389,327 B2 * | 6/2008 | Kitahara ................ 709/210 |
| 7,831,621 B1 | 11/2010 | Banks et al. |
| 7,886,071 B2 | 2/2011 | Tomita |
| 2003/0163622 A1 | 8/2003 | Moran |
| 2003/0225898 A1 * | 12/2003 | Saika et al. ................ 709/229 |
| 2003/0229749 A1 | 12/2003 | Saito et al. |
| 2005/0114575 A1 * | 5/2005 | Weisser et al. ................ 710/74 |
| 2005/0165971 A1 | 7/2005 | Warren |
| 2005/0223136 A1 * | 10/2005 | Tanaka et al. ................ 710/22 |
| 2006/0023242 A1 * | 2/2006 | Fujita et al. ................ 358/1.13 |
| 2007/0088865 A1 * | 4/2007 | Breyer ................ 710/22 |
| 2007/0192516 A1 * | 8/2007 | Ibrahim et al. ................ 710/22 |
| 2008/0005514 A1 * | 1/2008 | Kurokawa et al. ............ 711/163 |
| 2008/0052484 A1 * | 2/2008 | Ohno ................ 711/171 |
| 2009/0060028 A1 * | 3/2009 | Liu et al. ................ 375/240.01 |

* cited by examiner

DATA TRANSFER BETWEEN DEVICES MAINTAINING STATE DATA

FIELD OF THE INVENTION

The present invention relates to the field of measurement, and more particularly to a system and method for transferring data between devices utilizing state data.

DESCRIPTION OF THE RELATED ART

Measurement systems often include a host device that is in communication with two or more other devices to perform a desired task. While performing such a task, it may be desirable to transfer data between other non-host devices. For example, various existing measurement systems allow such transfers by using the host device or a memory of the host device. However, these systems do not provide the flexibility and efficiency that are demanded by present tasks. Accordingly, improvements in data transfers among devices are desired.

SUMMARY OF THE INVENTION

Various embodiments are disclosed of a system and method for transfer of data between devices utilizing state data. More particularly, the system and method may involve transferring data between a writer device and a reader device on a common bus.

A host device may create a transfer session (e.g., a peer to peer streaming session) between the writer device and the reader device. Each of the host device, the writer device, and the reader device may maintain state data of the transfer session. The state data may include an enabled state and a disabled state. The state data may also include an unlinked state, which may be the initial state before the creation of the transfer session. After creating the transfer session, each device may be in the disabled state.

Thereafter, the host device may enable a direct transfer of data between the writer device and the reader device, e.g., by notifying at least one of the reader device or the writer device of a state change from the disabled state to the enabled state. In some embodiments, the host enabling the direct transfer may be performed in response to at least one of the reader device or the writer device changing from the disabled state to the enabled state. For example, the reader device may notify the host of a change from the disabled state to the enabled state. Accordingly, the host device may enter the enabled state and notify the writer device of the enabled state. Optionally, the host device (e.g., in response to user input) or the writer device may change from disabled to enabled initially. After enabling, data may be transferred directly between the writer device and the reader device without involving the host device.

During or after the transfer, the host device may disable the direct transfer of data between the writer device and the reader device, e.g., by notifying at least one of the reader device or the writer device of a state change from the enabled state to the disabled state. Similar to the enabling above, the disabling may be caused by any of the reader device, the writer device, or the host (e.g., in response to user input). After disabling, the direct transfer of data between the writer device and the reader device may be stopped.

In cases where the direct transfer is disabled before completion, the writer device may enter a flushing state before entering the disabled state. In the flushing state, the writer device may continue to transfer remaining buffered data to the reader device. After the buffered data is transferred, the writer device enters the disabled state.

After completion of the data transfer (or at other times), the host device may close or disable the transfer session, e.g., by notifying the reader device and the writer device of a state change to the unlinked state.

The use of state information to manage the device-device communication provides a number of benefits. For example, the use of state information allows any one of the writer device, the reader device, and/or the host computer to enable or disable a transfer of data at any point, before, during, or after transfer. Thus, each device may be aware of the current state of the transfer using the state model described herein and may also be able to effect a change in state for each of the other devices, thereby providing a more flexible and efficient method for transferring data.

BRIEF DESCRIPTION OF THE DRAWINGS

A better understanding of the present invention can be obtained when the following detailed description of the preferred embodiment is considered in conjunction with the following drawings, in which.

Figure 1A:
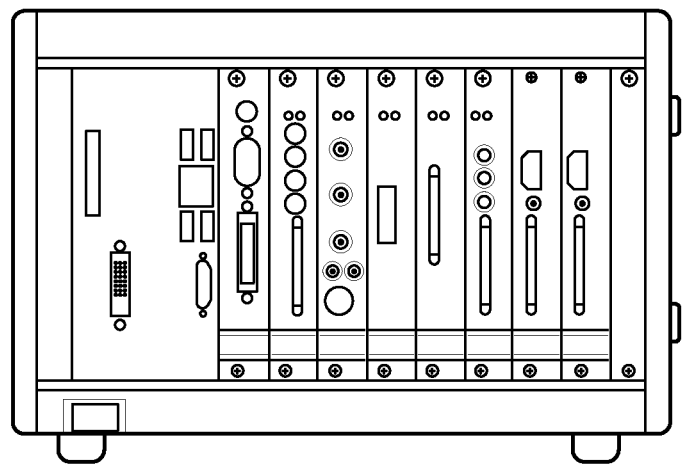
FIGS. 1A and 1B illustrates a chassis system including a host device, a reader device, and a writer device, which may be configured to implement various embodiments of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Figure 1B:
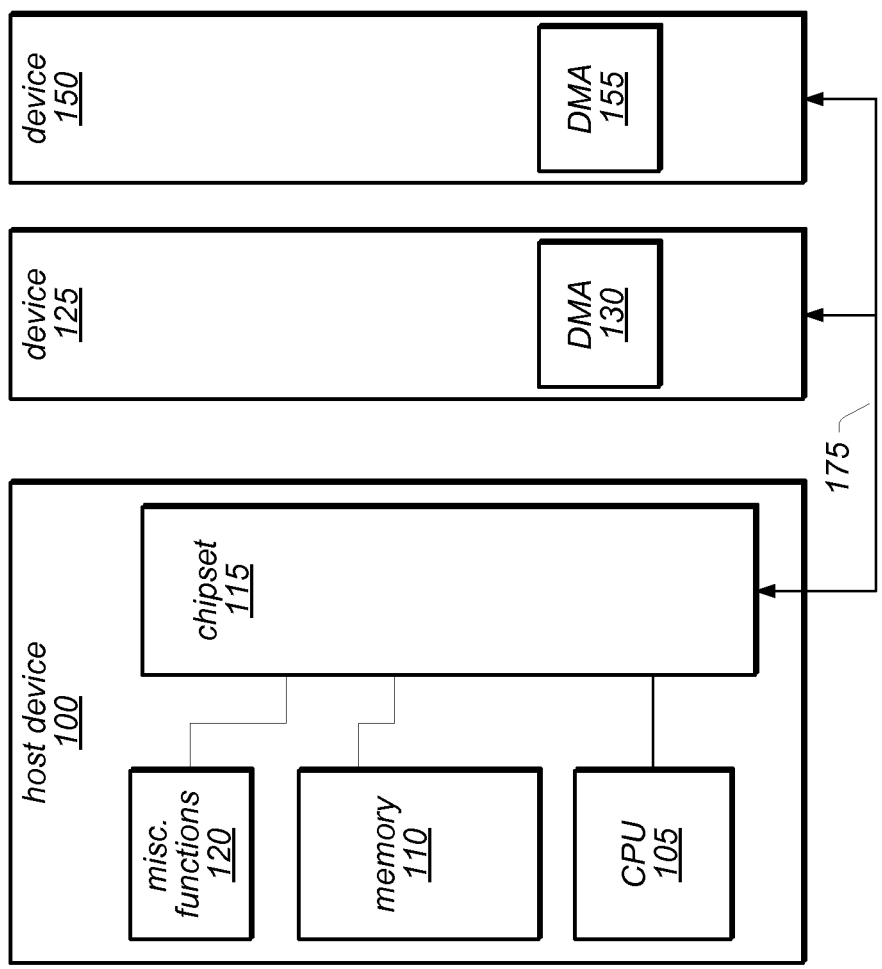

FIGS. 1A and 1B—Chassis 50

FIGS. 1A and 1B illustrate an exemplary chassis 50. As shown, the chassis 50 may include a host device 100 (e.g., a host controller board), which may include a CPU 105, memory 110, and chipset 115. Other functions that may be found on the host device 100 are represented by the miscellaneous functions block 120. In some embodiments, the host device may include a processor and memory (as shown) and/or may include a programmable hardware element (e.g., a field programmable gate array (FPGA)). In embodiments where the host device includes a programmable hardware element, it may be configured according to a graphical program as described in the various patents incorporated by reference above.

As shown, the host device 100 (e.g., the chipset 115 of the host device 100) may provide communication (e.g., PCIe communication, PXI communication, or other bus communication) to a first peripheral device (e.g., a writer device) 125, and a second peripheral device (e.g., a reader device) 150 over bus 175. Note that while only a reader device and a writer device are described herein, there may be any number of devices coupled to the host device 100 over the bus 175. The devices may be any of various devices (e.g., PCIe devices), such as measurement devices (e.g., DAQ devices), processing devices, I/O devices, network devices, etc. Additionally, similar to above, the devices may include one or more programmable hardware elements or processors and memory to implement their respective functionality. In some embodiments, the writer device 125 and the reader device 150 may include a DMA controller (130 and 155 respectively) to perform DMA transfers, e.g., to perform the transfers of data described herein.

As indicated above, embodiments of chassis 50 may be used in test and measurement systems, such as systems used to acquire, process or output data relating to a device or process being monitored or controlled, for instance. Accordingly, such a system may acquire data, and subsequently transfer the data for processing, storage, output, or the like. For example, in the case of chassis 50 being used to control a process (e.g., a closed loop system) data may be acquired, transferred to a processor where it may be processed, and subsequently transferred to an output such that the processed output may be employed to appropriately control the respective process.

Often, streams of large amounts of data may be required to ensure data is being transferred at an appropriate rate. Moreover, where devices are used to implement several processes, certain channels for transferring data may include bottlenecks that slow the transfer of data or that otherwise inhibit the performance of the system. For this reason, in some embodiments, it may be beneficial to move data directly between the various peripheral devices (e.g., boards) that perform these different functions. For instance, the computer system 100 may support concurrent direct transfers of data between the reader and writer devices 125 and 150 via bus 175.

In some embodiments, data may be transferred from a source (writer) device to a target (reader) device of system 50. The nomenclature of these devices may be used interchangeably based on the current role of the device (e.g., whether or not the device is sending or receiving data). Where multiple devices may transfer data, such transfers may happen concurrently. For example, a first reader and writer device pair may transfer data as described herein while a second reader and writer device also transfer data.

Figure 2A:
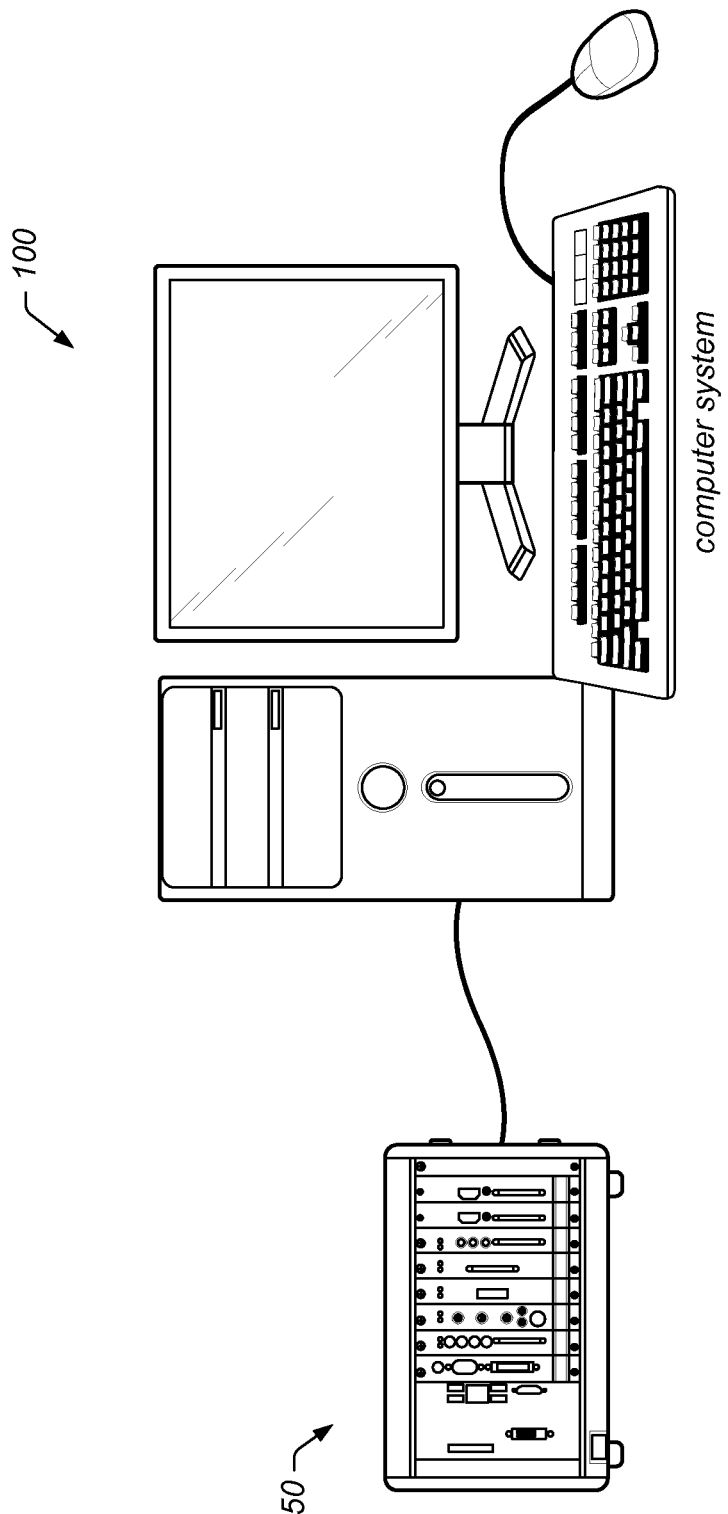
FIGS. 2A-2C illustrates various computer systems which may be configured to implement various embodiments of the present invention.
Figure 2B:
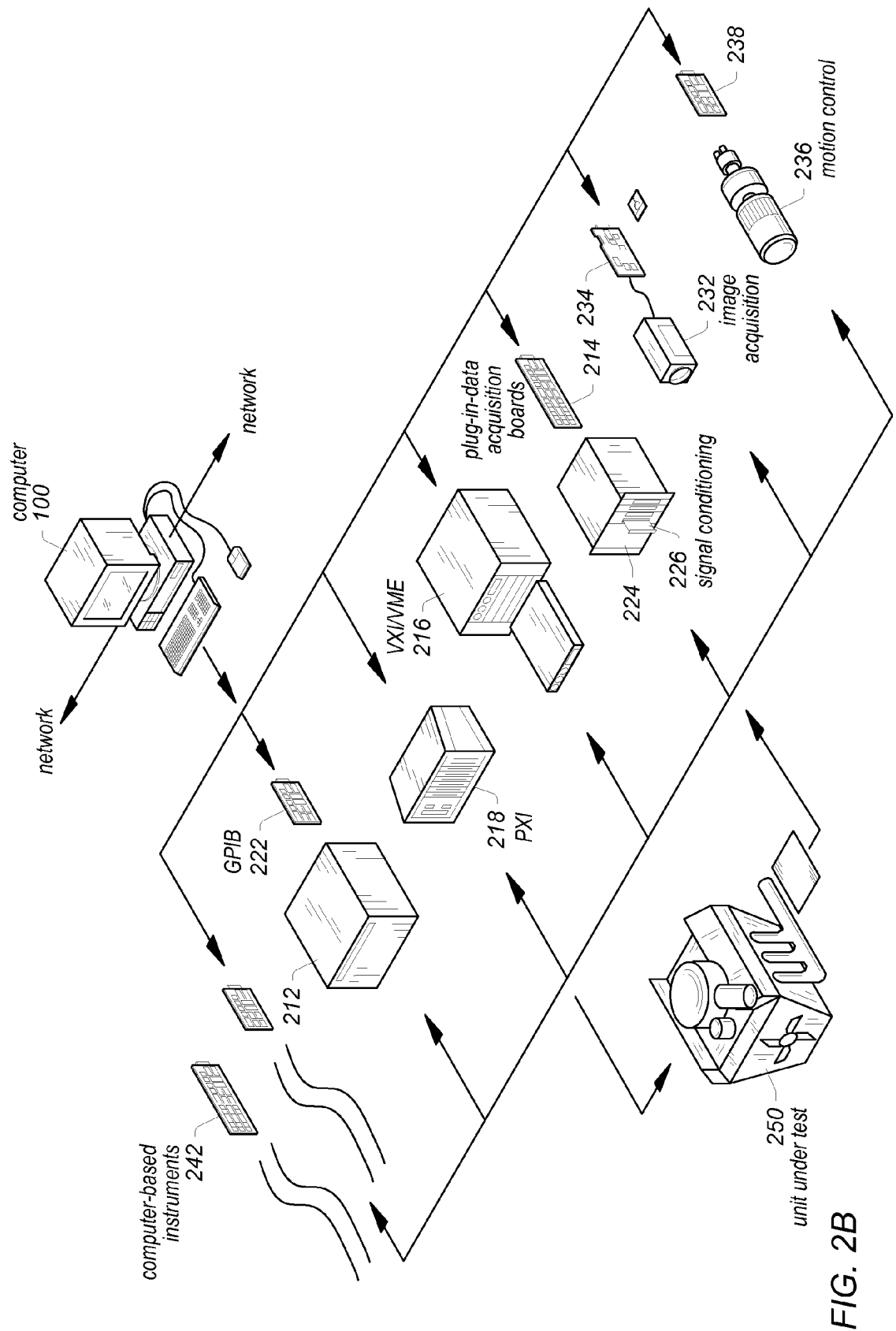
Figure 2C:
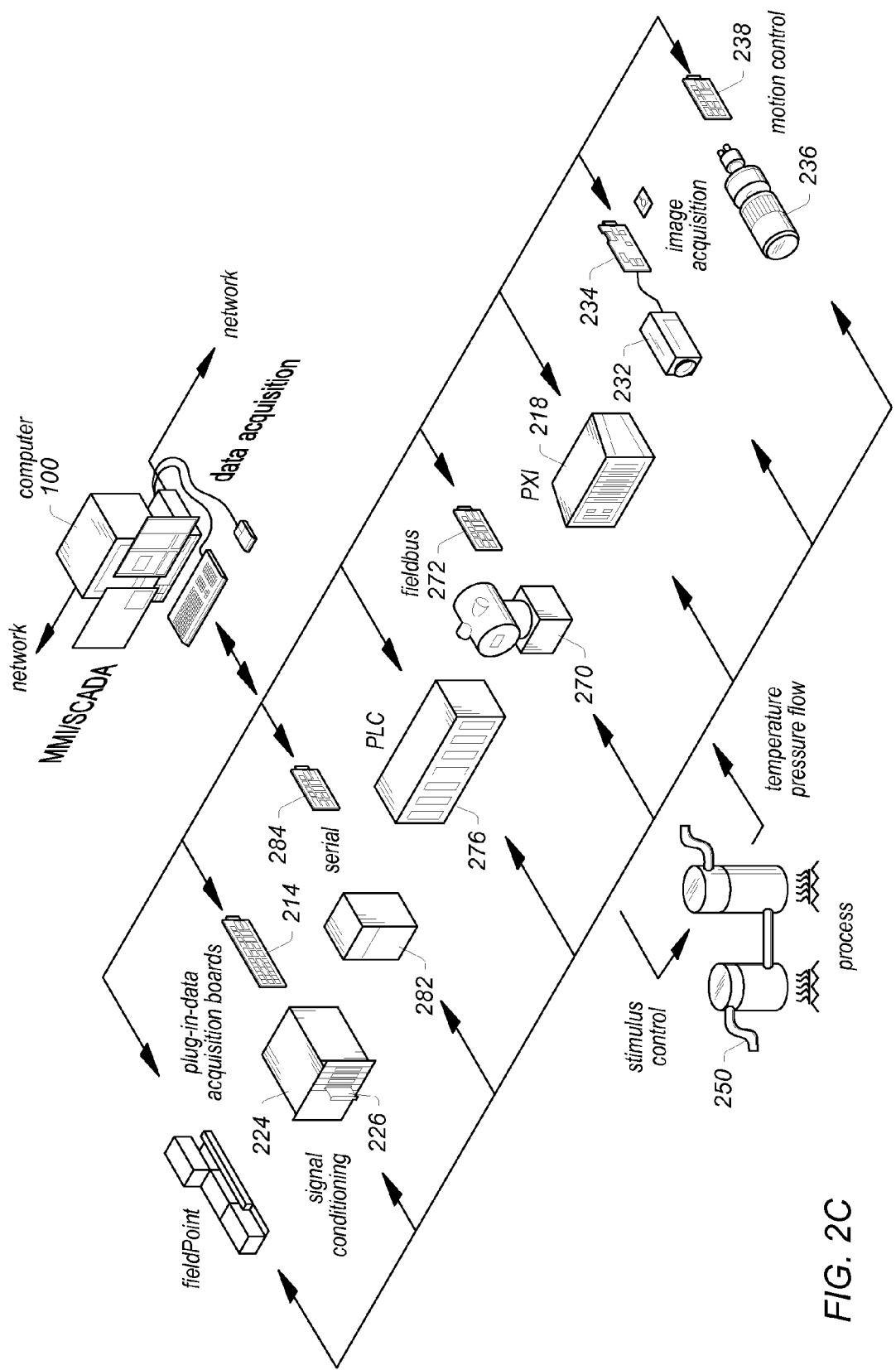

FIGS. 2A-2C—Computer System

FIGS. 2A-2C illustrate host device 100 as a computer system. As shown in FIG. 2A, the host device 100 may be coupled to chassis 50 (e.g., including the first peripheral device and the second peripheral device) and may include a display device and one or more input devices. Similar to descriptions of the host device 100 above, the host may include at least one memory medium on which one or more computer programs or software components according to one embodiment of the present invention may be stored. The memory medium may also store operating system software, as well as other software for operation of the computer system. Various embodiments further include receiving or storing instructions and/or data implemented in accordance with the foregoing description upon a carrier medium.

In various embodiments, the host device 100 may be coupled to a second computer system or device via a network (or a computer bus). The computer systems may each be any of various types, as desired. The network can also be any of various types, including a LAN (local area network), WAN (wide area network), the Internet, or an Intranet, among others.

FIG. 2B illustrates an exemplary instrumentation control system which may implement embodiments of the invention. As shown, the system comprises a host device 100 which couples to one or more other devices (e.g., which may be the writer device 125 and/or the reader device 150 described above). The host device may operate with the one or more devices to analyze, measure or control a unit under test (DUT) or process.

The one or more devices may include a GPIB instrument 212 and associated GPIB interface card 222, a data acquisition board 214 inserted into or otherwise coupled with chassis 224 with associated signal conditioning circuitry 226, a VXI instrument 216, a PXI instrument 218, a video device or camera 232 and associated image acquisition (or machine vision) card 234, a motion control device 236 and associated motion control interface card 238, and/or one or more computer based instrument cards 242, among other types of devices. The computer system may couple to and operate with one or more of these devices. The instruments may be coupled to the unit under test (DUT) or process, or may be coupled to receive field signals, typically generated by transducers. The system may be used in a data acquisition and control application, in a test and measurement application, an image processing or machine vision application, a process control application, a man-machine interface application, a simulation application, or a hardware-in-the-loop validation application, among others.

FIG. 2C illustrates an exemplary industrial automation system which may implement embodiments of the invention. The industrial automation system is similar to the instrumentation or test and measurement system shown in FIG. 2B. Elements which are similar or identical to elements in FIG. 2B have the same reference numerals for convenience. The system may comprise a host device 100 which couples to one or more devices or instruments. Similar to above, the host device 100 may comprise a CPU, a display screen, memory, and one or more input devices such as a mouse or keyboard as shown. The host device 100 may operate with the one or more devices to perform an automation function with respect to a process or device, such as MMI (Man Machine Interface), SCADA (Supervisory Control and Data Acquisition), portable or distributed data acquisition, process control, advanced analysis, or other control, among others.

The one or more devices may include a data acquisition board 214 inserted into or otherwise coupled with chassis 224 with associated signal conditioning circuitry 226, a PXI instrument 218, a video device 232 and associated image acquisition card 234, a motion control device 236 and associated motion control interface card 238, a fieldbus device 270 and associated fieldbus interface card 272, a PLC (Programmable Logic Controller) 276, a serial instrument 182 and associated serial interface card 284, or a distributed data acquisition system, such as the Fieldpoint system available from National Instruments, among other types of devices.

Figure 3:
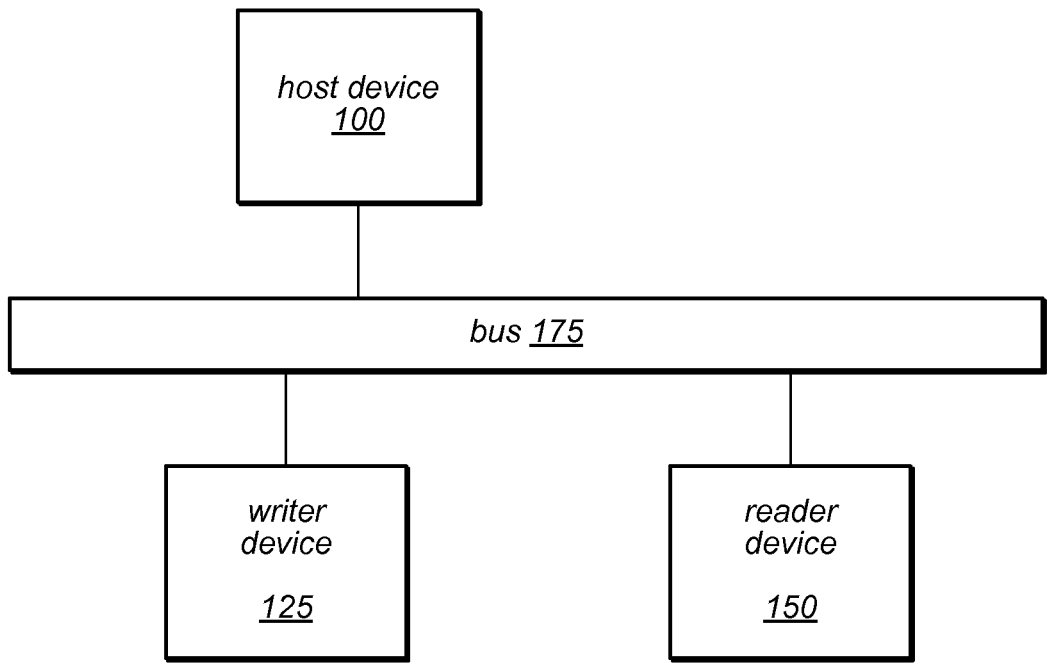
FIG. 3 illustrates a block diagram of a system including a host device, a reader device, and a writer device, which may be configured to implement various embodiments of the present invention.

FIG. 3—Exemplary Block Diagram

FIG. 3 is a generalized block diagram of a system that is configured to implement various embodiments of the methods described herein. As shown in this block diagram, the host device 100 may couple to the writer device 125 and the reader device 150 via bus 175. In the particular embodiment shown in FIG. 3, the host device 100 may include a programmable hardware element 300 as well as a processor and memory 305 and 310. Additionally, each of the writer device and reader device may include a DMA controller for performing data transfers as described herein.

However, it should be noted that the host device, writer device, reader device, and system of FIG. 3, may be implemented according to any of the details described with respect to FIGS. 1A-2C above and that other variations are envisioned. For example, while the above descriptions focus on embodiments where the devices are local (e.g., on a bus within a chassis or coupled to a computer system), the methods described herein may also apply to any two end-points and a master controller (e.g., computer systems sending data over Ethernet). Thus, while the methods described herein may be particularly applicable to local data transfers, they may be applied to the transfer of data between any two devices involving a host.

Figure 4:
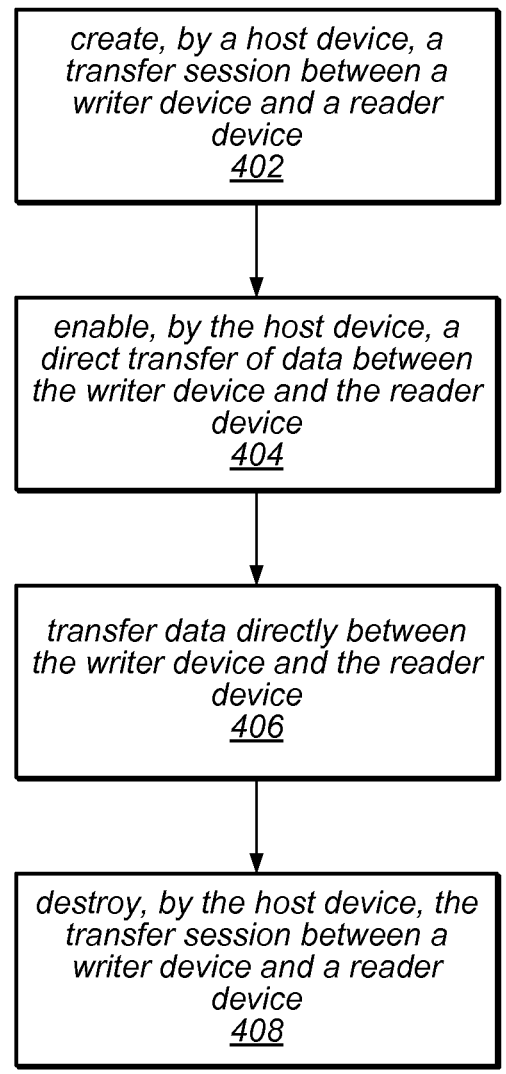
FIG. 4 is a flowchart diagram illustrating one embodiment of a method for transferring data between devices maintaining state data.

FIG. 4—Transferring Data Between Devices Maintaining State Data

FIG. 4 illustrates a method for transferring data between devices utilizing state data. More particularly, the method may involve transferring data between a writer device and a reader device on a common bus. The method shown in FIG. 4 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 402, a transfer session (e.g., a peer to peer streaming session) may be created between the writer device and the reader device. Because the host device of the system is the only device with prior knowledge of both the reader device and the writer device, the host device may create the session in 402. The host device may be a supervisory entity, which may be responsible for creating and destroying the transfer session and may also be configured to coordinate the actions of the writer device and the reader device. However, in embodiments where the reader device or writer device is aware of all the devices, it may be possible for one of these devices to create the transfer session.

As described above, the host device, the reader device, and the writer device may all be coupled to a common bus, although other embodiments are envisioned. In one particular embodiment, the reader device and the writer device may be PCI or PCIe devices which are coupled over a PCI or PCIe bus. However, as described above, the devices may any of various devices, such as measurement devices. In further embodiments, however, the reader device and writer device may be coupled over different connection types, e.g., local or wide area networks.

Figure 5A:
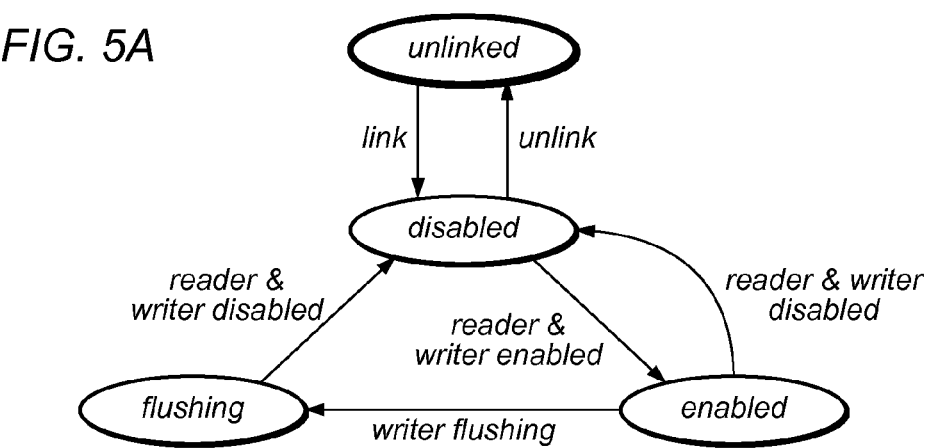
FIGS. 5A-5C illustrate exemplary states for the host device, the reader device, and the writer device, according to one embodiment.
Figure 5B:
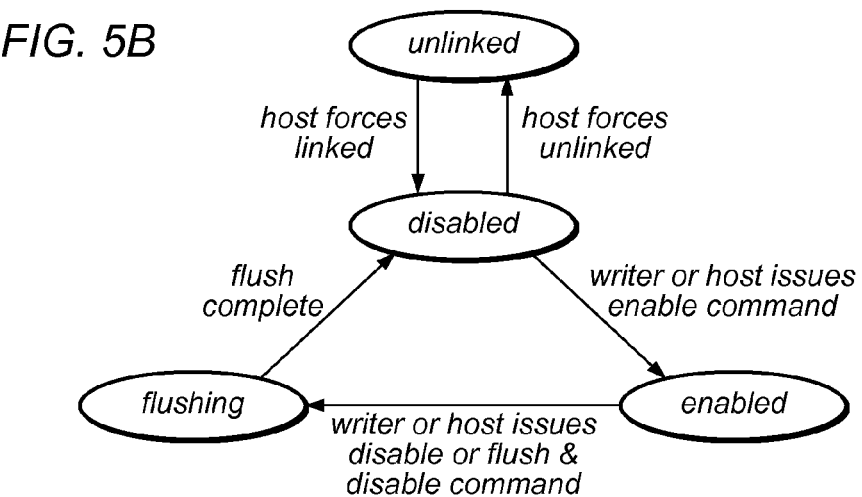
Figure 5C:
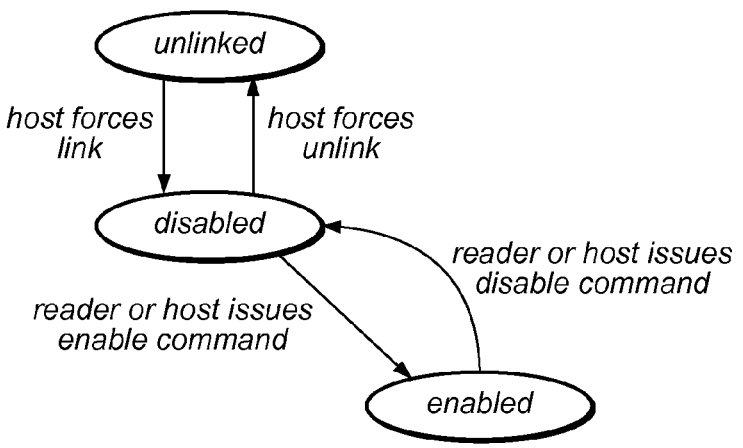

Each of the host device, the writer device, and the reader device may maintain state data of the transfer session. The state data may at least include an enabled state and a disabled state. The state data for each of the devices may also include an unlinked state, which may be the initial state before the creation of the transfer session in 402. Thus, prior to creation of the transfer session in 402, the reader device and the writer device may be in the unlinked state and may not be aware of the other's presence. Additionally, the host and writer devices may also include a flushing state, which is described in more detail below. FIGS. 5A-5C, also described below, provide state diagrams for each of the host device, the writer device, and the reader device, respectively. After creating the transfer session, each device may be in the disabled state.

Thereafter, in 404, the host device may enable a direct transfer of data between the writer device and the reader device, e.g., by notifying at least one of the reader device or the writer device of a state change from the disabled state to the enabled state. In some embodiments, the host enabling the direct transfer may be performed in response to at least one of the reader device or the writer device changing from the disabled state to the enabled state. For example, the reader device may notify the host of a change from the disabled state to the enabled state. Accordingly, the host device may enter the enabled state and notify the writer device of the enabled state. Optionally, the host device (e.g., in response to user input) or the writer device may change from disabled to enabled initially. Thus, the data transfer from the writer to the reader can be unilaterally enabled (and as described below, disabled) by the host device, the writer device, or the reader device. After enabling, data may be transferred directly between the writer device and the reader device without involving the host device.

In 406, data may be transferred from the writer device to the reader device, e.g., directly. For example, the data may be transferred over a bus (e.g., to which the host device is coupled) from the writer device to the reader device, but the host device may not receive any of the data being transferred. More specifically, in one embodiment, the writer device may include a DMA controller and may be configured to provide the data directly from the writer device to the reader device, e.g., without involving the host device (e.g., a processor and/or memory of the host device). Thus, in 406, a DMA controller of the writer device may be configured and the data may be transferred to the reader device via DMA. The reader device may be similarly configured (e.g., by a processor on the reader device) to receive the DMA transfer. However, other types of transfers between the writer device and the reader device are envisioned. In various embodiments, the data for transfer may be requested by the reader device, determined by the writer device, or initiated by the host device. In some embodiments, the host device may manage the initial set up of the data transfer, but as indicated above, may not be involved in the transfer itself.

During or after the transfer, the host device may disable the direct transfer of data between the writer device and the reader device, e.g., by notifying at least one of the reader device or the writer device of a state change from the enabled state to the disabled state. Similar to the enabling above, the disabling may be caused by (e.g., a request from) any of the reader device, the writer device, or the host (e.g., in response to user input). After disabling, the direct transfer of data between the writer device and the reader device may be stopped and each state of the devices may be changed from enabled to disabled (possibly through intermediate states). For example, in cases where the direct transfer is disabled before completion, the writer device may enter a flushing state before entering the disabled state. In the flushing state, the writer device may continue to transfer remaining buffered data to the reader device. After the buffered data is transferred, the writer device may enter the disabled state.

In 408, after completion of the data transfer (or at other times), the host device may close or disable the transfer session, e.g., by notifying the reader device and the writer device of a state change to the unlinked state.

FIGS. 5A-5C—Exemplary State Diagrams for Host, Writer, and Reader

FIGS. 5A-5C illustrate exemplary state diagrams for the host device, the writer device, and the reader device, respectively. As shown in the figures, the host device and writer device transition between four states: unlinked, disabled, enabled, and flushing, while the reader transitions between three states: unlinked, disabled, and enabled. The following provides descriptions for each device and corresponding transitions between states. Note that the below description does not limit any of the embodiments described above.

As shown in FIGS. 5A-5C, each device initializes to the unlinked state. When unlinked, the writer and reader are inactive, and may await the creation of a data transfer session by the host device (see FIGS. 5B and 5C). Upon creation of the transfer session, the host device may force the state of the writer device and the reader device to disabled (see FIGS. 5A-5C). To start the transfer of data, the state of each entity may be enabled. Any device may trigger the transition from disabled to enabled. For example, if the host device wishes to start the transfer of data (e.g., in response to user input), it may direct the writer device and the reader device to transition to enabled (FIG. 5A). Alternatively, if the writer device wishes to start the transfer of data, it may transition to enabled and prompt the host device to direct the reader device to transition to enabled (FIG. 5B). Similarly, if the reader device wishes to start the transfer of data, it may transition to enabled and prompt the host device to direct the writer to transition to enabled (FIG. 5C).

To stop the transfer of data, the state of each entity may be disabled. Similar to above, any entity may trigger the transition from enabled to disabled. For example, if the host device wishes to stop the transfer of data (e.g., in response to user input), it may direct the writer device and the reader device to transition to Disabled (FIG. 5A). Alternatively, if the writer device wishes to stop the transfer of data, it may transition to disabled and prompt the host device to direct the reader device to transition to disabled (FIG. 5B). Similarly, if the reader device wishes to stop the transfer of data, it may transition to disabled and prompt the host device to direct the writer device to transition to disabled (FIG. 5C). When the transfer session is no longer required, it can be destroyed by the host device (FIG. 5A). When destroying the transfer session, the host device may force the state of the writer device and reader device to unlinked (FIGS. 5B and 5C).

Note that in FIGS. 5A and 5B, the transition from enabled to disabled goes through an intermediate state, flushing. In some embodiments, the writer device maintains a queue for all data elements to be transferred to the reader device. If the state of the writer device is transitioned to disabled before all queued data elements are transferred to the reader device, all queued data elements may be lost. The flushing state may be required to prevent the loss of data that may occur when the transition from enabled to disabled occurs abruptly or unexpectedly. To prevent the loss of queued data elements, the writer device may transition to flushing before transitioning to disabled (FIG. 5B). When in flushing, the writer device continues to transfer data to the reader device until all queued data elements have been transferred. Once the buffered transfer is complete, the writer device may automatically transition to disabled (FIG. 5B). Optionally, if the loss of data is unimportant, the writer device can be directed to transition to flushing for a minimum amount of time. In this embodiment, the writer device will transition to flushing to complete the transfer of the current data element only. All other data elements in the queue are discarded. Alternatively, where data loss is unimportant, the flushing state may be skipped or removed.

The state model may be used to control when a writer device and reader device may enqueue and dequeue data elements. A writer device may be permitted to enqueue data elements when enabled only, while a reader device may be permitted to dequeue data elements when enabled or disabled. It may be necessary allow the reader device to dequeue data elements disabled because there may be data elements available in the reader device's queue that were transferred before becoming disabled.

Thus, in the embodiments of FIGS. 5A-5C, the host device may be the sole coordinator in all state transitions, which may ensure that all three devices remain synchronized throughout the life of the transfer session. State transitions on the writer device and reader device may not occur at precisely the same time, but this may be unimportant.

Further Embodiments

Note that while the above embodiments were described with respect to unicast streams between a first device and a second device, multiple devices may be involved. For example, in one embodiment, the method described above may be extended to multicast streams where data is transferred from a first device to a plurality of other devices.

Additionally, the reader and/or writer device(s) may be acquisition devices, e.g., arbitrary waveform generators and possibly traditional DAQ devices with output channels.

Advantages

The use of state information to manage the device-device communication provides a number of benefits. For example, the use of state information allows any one of the writer device, the reader device, and/or the host computer to enable or disable a transfer of data at any point, before, during, or after transfer. Thus, each device may be aware of the current state of the transfer using the state model described herein and may also be able to effect a change in state for each of the other devices, thereby providing a more flexible and efficient method for transferring data.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for performing transfers between a writer device and a reader device, wherein the writer device and the reader device are each coupled to a common bus, comprising:
a host device creating a transfer session between the writer device and the reader device, wherein the host device is separate and distinct from the writer device and the reader device, wherein each of the host device, the writer device, and the reader device independently maintains state data of the transfer session, wherein the state data comprises an enabled state and a disabled state, and wherein after said creating the transfer session, the state data of the transfer session maintained by each device is in the disabled state;
the host device enabling a direct transfer of data between the writer device and the reader device, wherein said enabling comprises the host device notifying at least one of the reader device or the writer device of a state change from the disabled state to the enabled state, and wherein after said enabling, data is transferred directly between the writer device and the reader device without involving the host device; and
the host device disabling the direct transfer of data between the writer device and the reader device, wherein said disabling comprises the host device notifying at least one of the reader device or the writer device of a state change from the enabled state to the disabled state, and wherein after said disabling, the direct transfer of data between the writer device and the reader device is stopped.

2. The method of claim 1, wherein said enabling is performed in response to at least one of the reader device or the writer device changing from the disabled state to the enabled state.

3. The method of claim 1, wherein said disabling is performed in response to at least one of the reader device or the writer device changing from the enabled state to the disabled state.

4. The method of claim 3, wherein said disabling is performed before completion of the direct transfer of data.

5. The method of claim 4, wherein the writer device comprises a flushing state, wherein the writer device enters the flushing state before the disabled state, wherein, in the flushing state, the writer device continues to transfer remaining buffered data to the reader device, and wherein, after the remaining buffered data is transferred, the writer device enters the disabled state.

6. The method of claim 1, wherein the state data further comprises an unlinked state, wherein prior to said initiating, the writer device and the reader device are in the unlinked state, and wherein the method further comprises:
the host device closing the transfer session, wherein said closing the transfer session comprises the host device notifying the reader device and the writer device of a state change to the unlinked state.

7. The method of claim 1, wherein the transfer session comprises a peer to peer streaming session.

8. The method of claim 1, wherein the writer device comprises a data acquisition device, and wherein the data comprises acquisition data of the data acquisition device.

9. A non-transitory computer accessible memory medium comprising program instructions for performing transfers between a writer device and a reader device, wherein the writer device and the reader device are each coupled to a common bus, and wherein the program instructions are executable by a processor of a host device to:
create a transfer session between the writer device and the reader device, wherein the host device is separate and distinct from the writer device and the reader device, wherein each of the host device, the writer device, and the reader device independently maintains state data of the transfer session, wherein the state data comprises an enabled state and a disabled state, and wherein after said creating the transfer session, the state data of the transfer session maintained by each device is in the disabled state;
enable a direct transfer of data between the writer device and the reader device, wherein said enabling comprises notifying at least one of the reader device or the writer device of a state change from the disabled state to the enabled state, and wherein after said enabling, data is transferred directly between the writer device and the reader device without involving the host device; and
disable the direct transfer of data between the writer device and the reader device, wherein said disabling comprises notifying at least one of the reader device or the writer device of a state change from the enabled state to the disabled state, and wherein after said disabling, the direct transfer of data between the writer device and the reader device is stopped.

10. The memory medium of claim 9, wherein said enabling is performed in response to at least one of the reader device or the writer device changing from the disabled state to the enabled state.

11. The memory medium of claim 9, wherein said disabling is performed in response to at least one of the reader device or the writer device changing from the enabled state to the disabled state.

12. The memory medium of claim 11, wherein said disabling is performed before completion of the direct transfer of data.

13. The memory medium of claim 12, wherein the writer device comprises a flushing state, wherein the writer device enters the flushing state before the disabled state, wherein, in the flushing state, the writer device continues to transfer remaining buffered data to the reader device, and wherein, after the remaining buffered data is transferred, the writer device enters the disabled state.

14. The memory medium of claim 9, wherein the state data further comprises an unlinked state, wherein prior to said initiating, the writer device and the reader device are in the unlinked state, and wherein the program instructions are further executable to:
close the transfer session, wherein said disabling the transfer session comprises notifying the reader device and the writer device of a state change to the unlinked state.

15. The memory medium of claim 9, wherein the transfer session comprises a peer to peer streaming session.

16. The memory medium of claim 9, wherein the writer device comprises a data acquisition device, and wherein the data comprises acquisition data of the data acquisition device.

17. A host device for performing transfers between a writer device and a reader device, wherein the host device is separate and distinct from the writer device and the reader device, comprising:
a processor;
one or more ports coupled to the processor, wherein the one or more ports are configured to couple to the reader device and the writer device over a common bus; and
a memory medium coupled to the processor, wherein the memory medium stores program instructions executable by the processor to:
create a transfer session between the writer device and the reader device, wherein each of the host device, the writer device, and the reader device independently maintains state data of the transfer session, wherein the state data comprises an enabled state and a disabled state, and wherein after said creating the transfer session, the state data of the transfer session maintained by each device is in the disabled state;
enable a direct transfer of data between the writer device and the reader device, wherein said enabling comprises notifying at least one of the reader device or the writer device of a state change from the disabled state to the enabled state, and wherein after said enabling, data is transferred directly between the writer device and the reader device without involving the host device; and
disable the direct transfer of data between the writer device and the reader device, wherein said disabling comprises notifying at least one of the reader device or the writer device of a state change from the enabled state to the disabled state, and wherein after said disabling, the direct transfer of data between the writer device and the reader device is stopped.

18. The host device of claim 17, wherein said enabling is performed in response to at least one of the reader device or the writer device changing from the disabled state to the enabled state.

19. The host device of claim 17, wherein said disabling is performed in response to at least one of the reader device or the writer device changing from the enabled state to the disabled state.

20. A system for performing transfers between a writer device and a reader device, comprising:
a host device;
a reader device coupled to the host device over a bus; and
a writer device coupled to the host device over the bus;
wherein the host device is separate and distinct from the writer device and the reader device; and
wherein the host device is configured to:
create a transfer session between the writer device and the reader device, wherein each of the host device, the writer device, and the reader device independently maintains state data of the transfer session, wherein the state data comprises an enabled state and a disabled state, and wherein after said creating the transfer session, the state data of the transfer session maintained by each device is in the disabled state;

enable a direct transfer of data between the writer device and the reader device, wherein said enabling comprises notifying at least one of the reader device or the writer device of a state change from the disabled state to the enabled state, and wherein after said enabling, data is transferred directly between the writer device and the reader device without involving the host device; and disable the direct transfer of data between the writer device and the reader device, wherein said disabling comprises notifying at least one of the reader device or the writer device of a state change from the enabled state to the disabled state, and wherein after said disabling, the direct transfer of data between the writer device and the reader device is stopped.

* * * * *